Dec. 14, 1937.   B. KIRSCH   2,102,418
AUTOMOTIVE AIR CIRCULATOR
Filed June 27, 1936   4 Sheets-Sheet 1
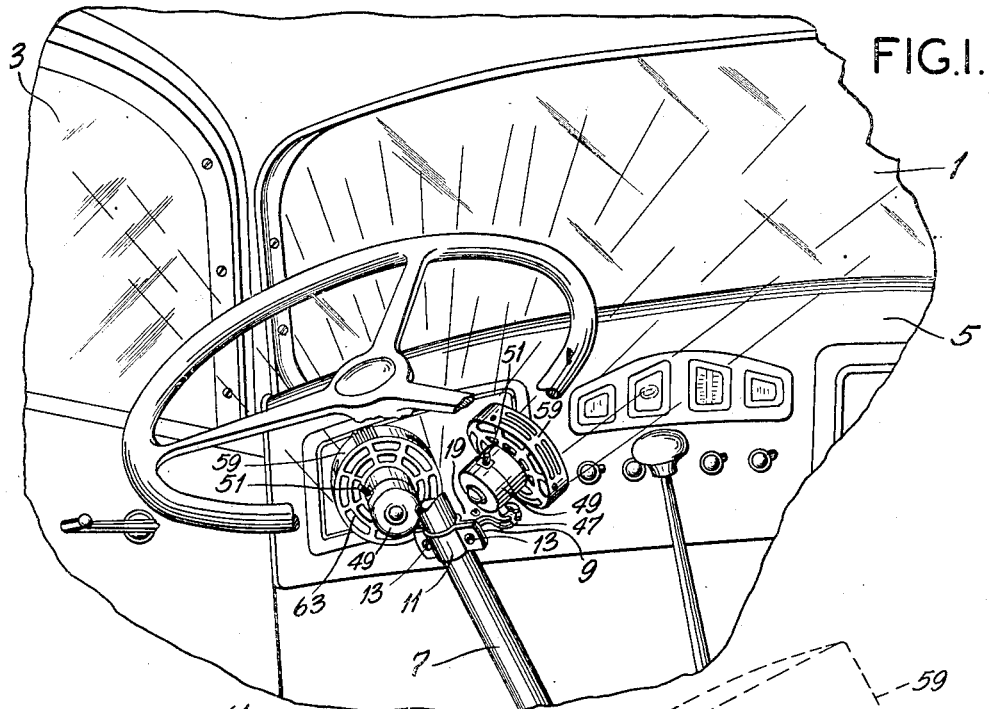
FIG.1.
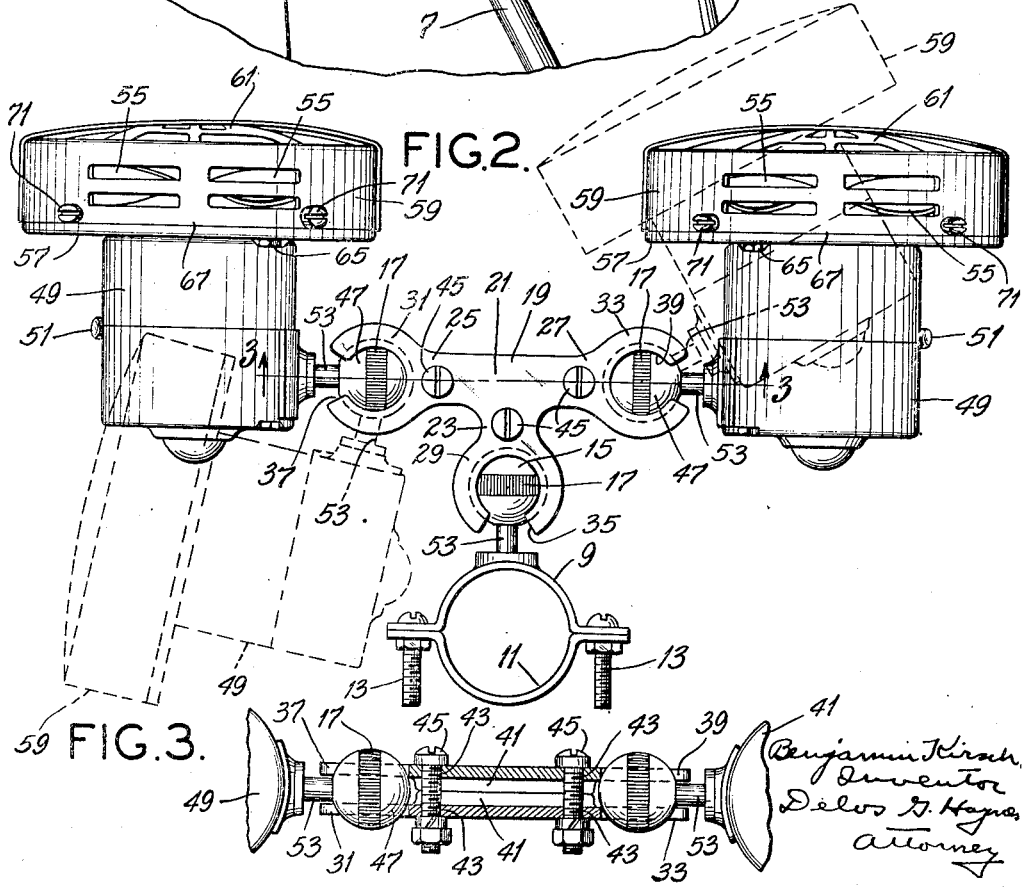
FIG.2.
FIG.3.

Dec. 14, 1937.    B. KIRSCH    2,102,418
AUTOMOTIVE AIR CIRCULATOR
Filed June 27, 1936    4 Sheets-Sheet 2
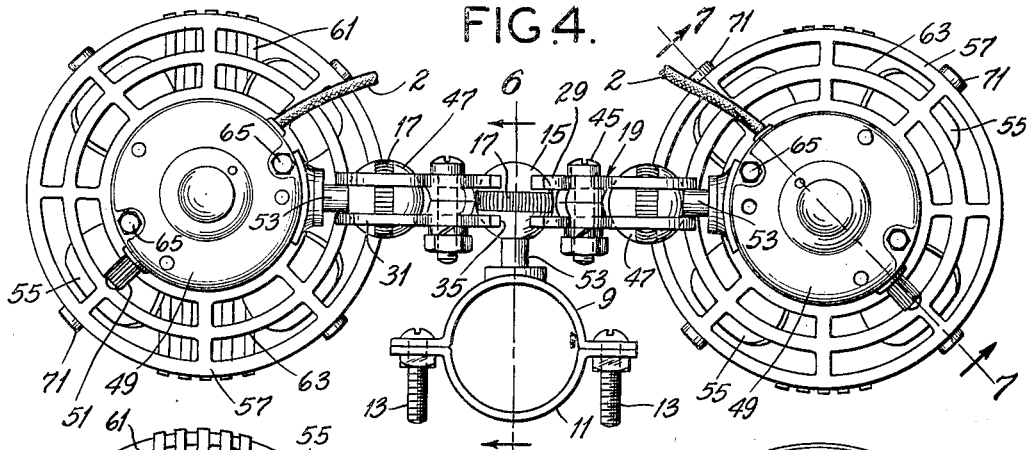
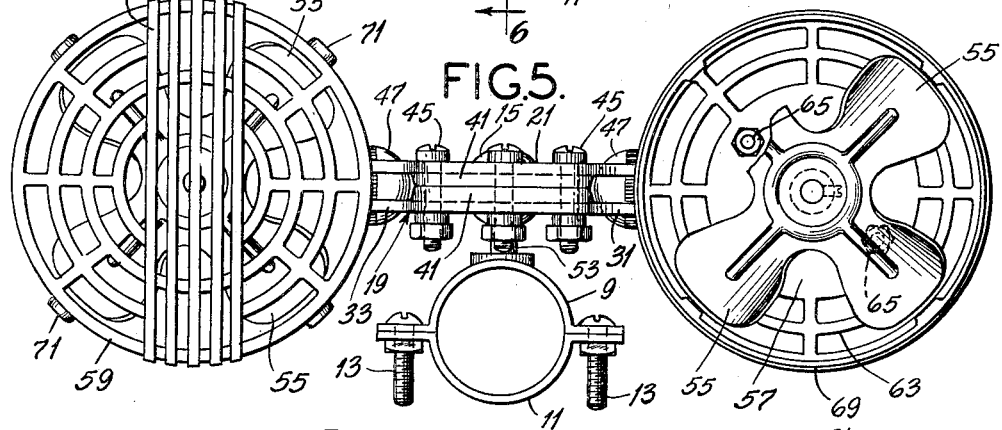
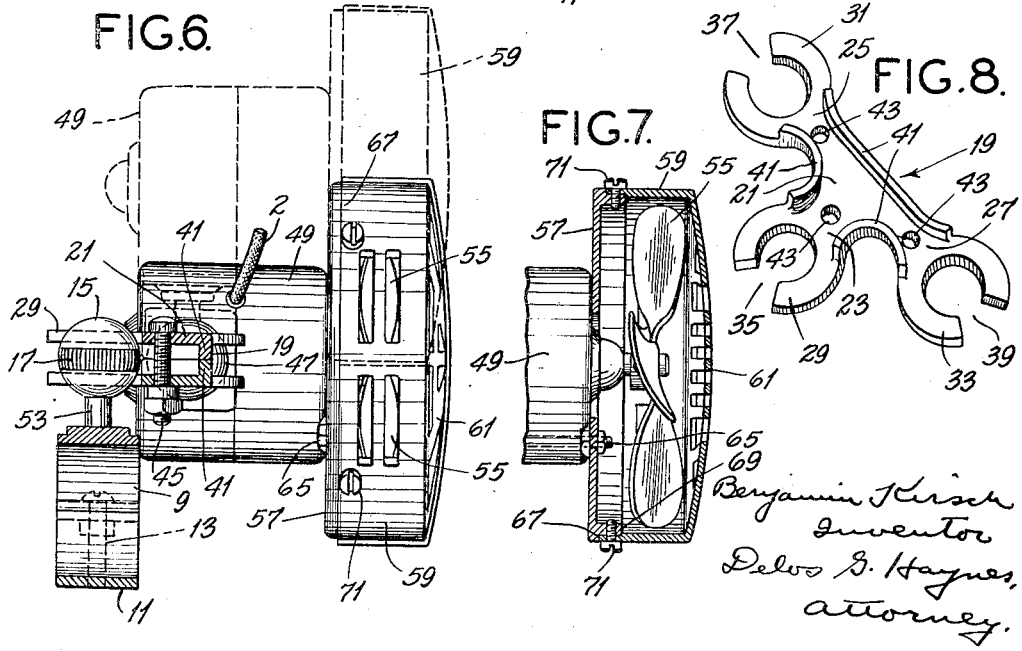

Dec. 14, 1937.   B. KIRSCH   2,102,418
AUTOMOTIVE AIR CIRCULATOR
Filed June 27, 1936   4 Sheets-Sheet 3

Benjamin Kirsch,
Inventor.
Delos G. Haynes,
Attorney.

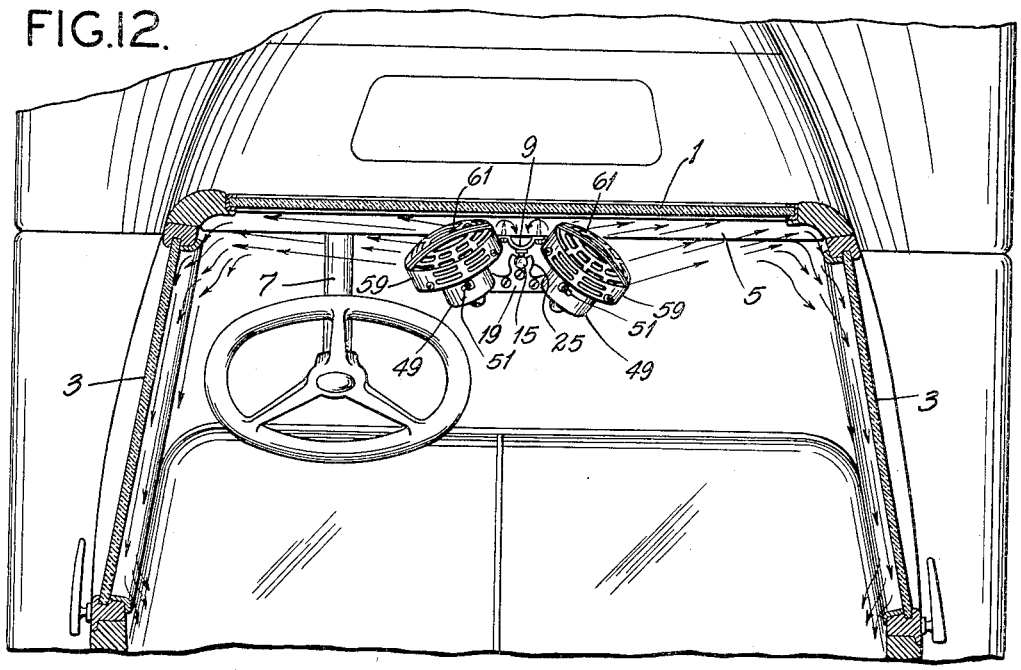
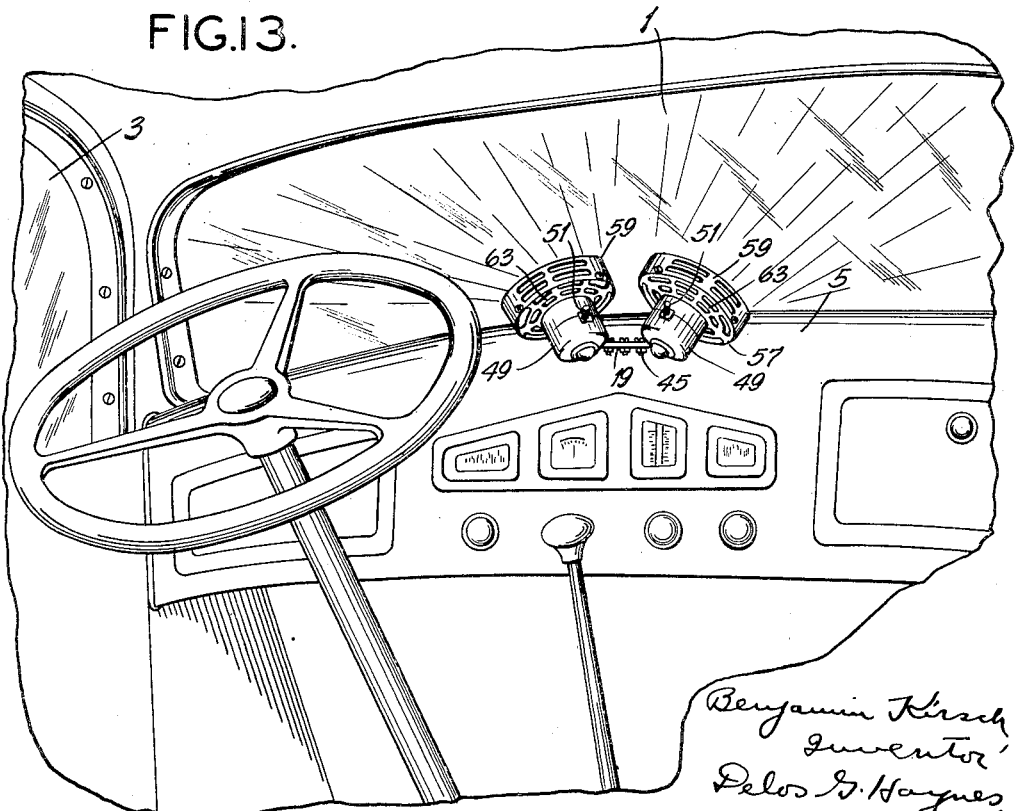

Patented Dec. 14, 1937

2,102,418

UNITED STATES PATENT OFFICE 2,102,418

AUTOMOTIVE AIR CIRCULATOR

Benjamin Kirsch, Chicago, Ill., assignor to Auto Radiator Manufacturing Co., Chicago, Ill., a corporation of Illinois Application June 27, 1936, Serial No. 87,681

3 Claims. (Cl. 20—40.5)

This invention relates to automotive air circulators, and with regard to certain more specific features, to fans for use in cooling automobiles during the summer, and for hot-air circulation in the winter.

Among the several objects of the invention may be noted the provision of a diminutive and compact form of fan, which despite its small size will nevertheless properly circulate air over a wide and effective range, so as effectively to cool in summer, and in winter to remove condensate and frost from the windshield and at least some windows, or to perform either function; the provision of apparatus of the class described which shall be universally adjustable to meet various conditions in automobile structures; the provision of apparatus of the class described having improved guard means of proper appearance and better than usual strength and safety; and the provision of apparatus of the class described which may be economically produced and sold. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention.

Fig. 1 is a fragmentary perspective view of the interior of an automobile showing one application of the invention;

Fig. 2 is a plan view of the apparatus, showing in solid lines a certain adjustment and in dotted lines another adjustment;

Fig. 3 is a cross-section taken on line 3—3 of Fig. 2;

Fig. 4 is a view similar to Fig. 2 showing another adjustment;

Fig. 5 is a rear elevation of Fig. 4;

Figure 9:
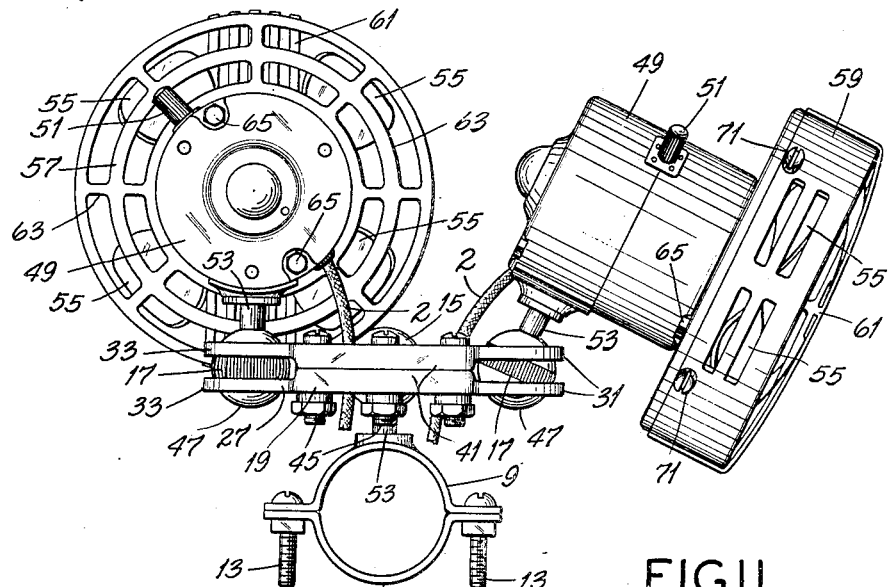
Figures 10, 11:
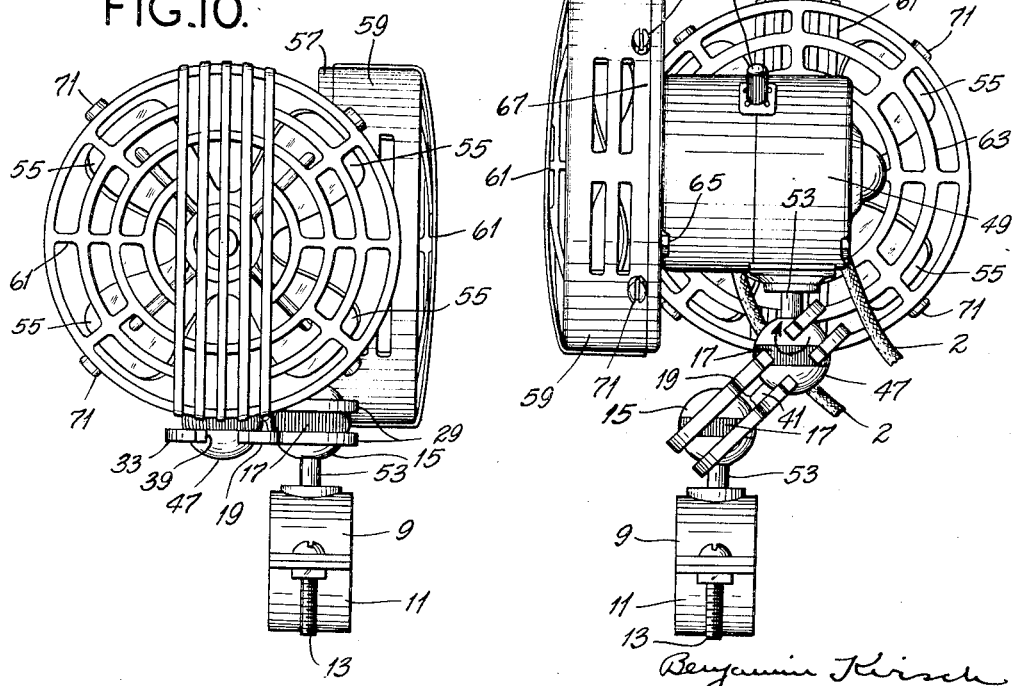

Fig. 6, in solid lines is a vertical section taken on line 6—6 of Fig. 4, the dotted lines showing an alternative fan adjustment;

Fig. 7 is a cross section taken on line 7—7 of Fig. 4;

Fig. 8 is a perspective view of one member of a three-armed clamp;

Fig. 9 is an end elevation similar to Fig. 5 showing another adjustment of parts;

Fig. 10 is a side elevation showing another adjustment;

Fig. 11 is a side elevation showing another adjustment;

Fig. 12 is a horizontal section taken through the front compartment of an automobile showing an alternative method of mounting the device; and, Fig. 13 is a fragmentary perspective of the front compartment shown in Fig. 12.

Similar reference characters indicate corresponding parts throughout the several views of the drawings.

Referring now more particularly to Fig. 1, there is shown the interior of the front compartment of an automobile having windshield 1, side windows 3 (see also Fig. 12), a cowl 5, and a steering post 7. As is known, in the winter, windshields such as 1 become interiorly fogged with condensate and under near-freezing atmospheric conditions, become iced on the outside. The ordinary automotive heater used induces greater condensation of moisture on the inside of the cold glass of the windshield 1, than if the heater were not used, and does not properly direct the heat against the glass to re-evaporate the condensates, nor to melt ice on the outside. The same is true of the windows 3, and others. It has been proposed to use flexible conduits from such heaters to direct the heat against the windshield, but these are clumsy and unsatisfactory in directing the heat all over the windshield, to say nothing of the inability to apply the heat to such windows such as 3. The present invention overcomes the above difficulties and also provides an air-circulating, cooling means for summer use.

My improved apparatus comprises a clamp composed of two halves 9 and 11 adapted to be held in clamped position by bolts 13. Both halves 9 and 11 may be used for clamping to the steering post 7, as shown in Figure 1, or a single half may be used for attaching the device to the cowl 5 shown in Figures 12 and 13.

Extending from the clamp-half is a gudgeon comprising a neck 53 and a ball 15 having a knurled band 17.

The ball 15 forms one element of a combination comprising a ball and socket joint. The other swivelling element of the joint is comprised by two clamping members 19, one of which is detailed in Fig. 8. Each of the members 19 comprises a relatively flat plate 21 having arms 23, 25, and 27 ending in horseshoe shapes 29, 31, and 33, respectively, with end openings 35, 37, and 39, respectively.

Each clamping plate 19 also carries a plurality of lips 41 arranged on the edges between respective horseshoe shapes. Considering a pair of the clamping plates 19, it will be seen that adjacent lips 41 may be made to engage by pairs between juxtaposed plates, so as to form horseshoe-shaped sockets for receiving therein ball members, such as member 15.

In order to hold a pair of the clamping plates 19 together in clamping position with lips 41 juxtaposed, holes 43 are provided for accommodating clamp screws 45. The lips 41 are of a depth which will cause the pairs of horseshoe-shaped members of adjacent clamp plates to solidly grip therebetween balls such as 15, just prior to the condition in which adjacent lips 41 of the respective clamp plates will contact. The edges of the inner sections of the horseshoe shapes are not bevelled off but left angular, so that there is a definite gripping of a ball to be held between respective pairs of horseshoes. It will be seen that the paired and spaced horseshoe shapes form four arcuate gripping fingers.

The resulting pair of horseshoe shapes at 29 is adapted to receive the ball end 15 of the gudgeon on the half-clamp 9. The pairs of horseshoe shapes 31 and 33 are adapted to receive balls 47 similar to ball 15 clamped to gudgeon on motors 49. The motors 49 are of diminutive size, of the 6 volt variety for current from the ordinary automotive battery. Individual control switches 51 are carried on the housings of the respective motors 49 and from the housings lead flexible wires 2.

It will be seen from Fig. 1 that the clamp halves 9 and 11 are clamped to the post 7 and that the plate clamps 19 may be swivelled on the ball 15. Thus the plate clamps 19 as a whole may be universally swivelled and the respective motors 49 may be swivelled on the ends of the respective arms 25 and 27. The swivelling is permitted whenever the screws 45 are loosened, and a fixed relationship may be maintained at any desired adjustment by again tightening such screws. It is also to be understood that individual swivelling of the balls 47 or 15 may be accompanied by loosening individual ones of these screws 45. Under these conditions the springiness in the plate 21 is enough to permit of holding one or more of the sockets clamped while the other is loosening for permitting swivelling to a new adjusted position of the respective ball.

As shown in Figures 2 to 4, the portions which form the connection between the balls and their respective parts are in the form of necks 53 of diameters small enough to snugly fit between the space provided between the flatwise horseshoe shapes. Thus, as indicated in the dotted lines in Fig. 2, the necks 53 may be revolved to fit between the pairs of fingers formed by said horseshoe shapes. Likewise, the openings 37 at the finger ends are made to accommodate said necks 53 so that they may be moved from position between the parallel pairs of fingers out into positions within the rings of the respective horseshoes, as shown by the arrow in Fig. 11, for instance.

The four-finger type of socket joint of horseshoe shape has the advantage not only of an effective grip at the inner biting edges, but the grip thus provided provides a relatively large number of positions to which the balls 15 and 47 may be adjusted and in which the necks 53 rest against some edge or face of the fingers. Thus in a large enough number of positions, dependence need not be placed entirely upon the clamping action for holding the device in adjusted position, one of the fingers forming a backing support per se. It is not here alleged that the clamping action is not satisfactory, but that there is employed the added feature of the steadying effect of the fingers against the necks. The steadying effect is particularly effective when the necks 53 are adjusted into position between parallel fingers, as indicated for example in the dotted lines in Fig. 2.

The motors 49 carry on their shafts fan blades 55 which serve to circulate air. In view of the above, it will be seen that the mounting will permit of supporting the fans constituted by the motors 49 and the blades 55 from a single support in any of various positions, and as a cluster such as shown in Fig. 1, in which a widely diffused draft of air may be projected upwardly over the windshield and around to the side windows. The use of a plurality of fans as a cluster for accomplishing this result, rather than one large fan, is advantageous in that the multiplicity of relatively small fans are better adapted to be driven by the small 6 volt motors. To have them clustered upon a single bracket avoids mounting complications.

In Fig. 12 is shown the part 9 attached to the cowl 5, the clamps 19 extending from the cowl and supporting the motor's fans at suitable angles such that a draft of air may be swept across the windshield 1 and around over the side windows 3. This is the adjustment for winter operation which will result in keeping all of the windshield and the side windows clean of both condensate and ice.

It will be noted that the ordinary heater for the car is mounted under the cowl 5 and that the positions of the motors 49 are such that the circulation of warm air is induced upwardly from the lower heated part of the compartment and over the windshield. Thus there is avoided a mechanical connection between the heater and that which directs the blast of warm air on the windshield. There is also obtained a much better distribution of air over the windshield and over the side windows. Beside the above advantages, the rear compartment of the automobile is better provided with warm air.

The various drawings show the latitude of adjustment. In Figures 1 to 5, the motor shafts are in the plane of the supporting brackets. Fig. 2 also shows by the dotted lines the possibility of a lateral swing of the motors without taking the shaft out of the plane of the brackets. In this circumstance, the respective necks 53 move into position between the clamping fingers. The difference between Figures 2-3 and 4-6, 9 and 10, is that in the former the clamps 19 are in the plane of the ring clamps 9, 11, whereas in the latter they are normal thereto.

In Figures 6, 9, 10 and 11 is shown the manner of adjustment for moving a motor shaft out of the plane of the bracket. In Fig. 9 is shown the possibility of a variety of positions as between motor adjustments. In Fig. 10 the axes of the necks 53 are located normally to the plane of the clamp. In Fig. 11 the axes of the necks 53 are at non-right-angles to the plane of the clamp. It is clear that a variety of other positions may be assumed by these respective parts.

Another phase of the invention is constituted by the guards employed for the fan blades 55. Heretofore, such guards have been made of wire or screen mesh, that is, ductile material of light weight. These have been made in a unitary form and slipped over the fan blades and held to motor casing. This has involved sacrifice of maximum safety, because of the openings left for permitting the guard to slip over the blades.

I make my guards of die castings of aluminum. The method of die casting permits of making a rigid guard of quite light weight which is comparable to the weight of the old wire or mesh guard. At the same time, a die cast form may be more readily made in a variety of intricate shapes without increase in expense. Furthermore, the guard is made in two pieces 57 and 59, as shown in Fig. 7. The front member 59 is formed with a safety grill, as shown at numeral 61, and the rear member is likewise formed with a safety grill as shown at numeral 63. It will be noted that the grill work 63 does not permit of applying the rear member 57 over the fan blade. To apply the rear member 57, the fan blades are removed from the motor shaft and the member 57 is bolted to the motor as indicated at 65. Then the fan blades are applied. Next the flanged edge 67 of the member 59 is slipped over the flanged edge 69 of the member 57. Fasteners 71 are used to hold the guard parts together. It is considered that this feature of a pair of separable, die cast guards is quite advantageous in providing a rigid guard, with greater protective features than were heretofore possible, with no increase in cost nor substantial increase in weight.

Furthermore, the guard can be given a much better appearance than the wire guards heretofore employed. This is because of the greater adaptability of the die casting method to intricate designs, than the wire forming method. Such designs in wire, are not rigid enough, whereas the same designs in a die cast form are rigid.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. An air circulator for automotive use comprising a single fixed support within a vehicle body, a bracket on said support, adjusting means between the bracket and the support, and a plurality of fans adjustably mounted on the bracket and forming a bracketed cluster.

2. An air circulator for automotive vehicles, comprising a single supporting member within a vehicle body, a ball supported by the supporting member, a bracket comprising adjustable clamping members for clamping said ball, a plurality of fan motors, supporting balls on such motors respectively, said clamping members also clamping said balls on the motors and permitting swivelling thereof, and air-projecting fans driven by said motors, the whole forming a cluster of fans upon a single support.

3. An air circulator for automotive vehicles, comprising a single supporting member within a vehicle body, a ball supported by the supporting member, a three legged bracket comprising clamping members for clamping said ball at one leg, a plurality of fan motors, supporting balls on such motors respectively, said clamping members also clamping said balls on the motors at the other legs respectively of the clamping members and permitting swivelling thereon, and air-projecting fans respectively driven by said motors, said motors being adapted to be independently swivelled on their respective balls in said clamping means, said clamping means being adapted to independently swivel on said ball on the main support, the whole forming a cluster of fans upon a single support.

BENJAMIN KIRSCH.